Feb. 24, 1942.      M. B. MENTLEY      2,274,491
GEAR FINISHING TOOL
Filed April 8, 1940
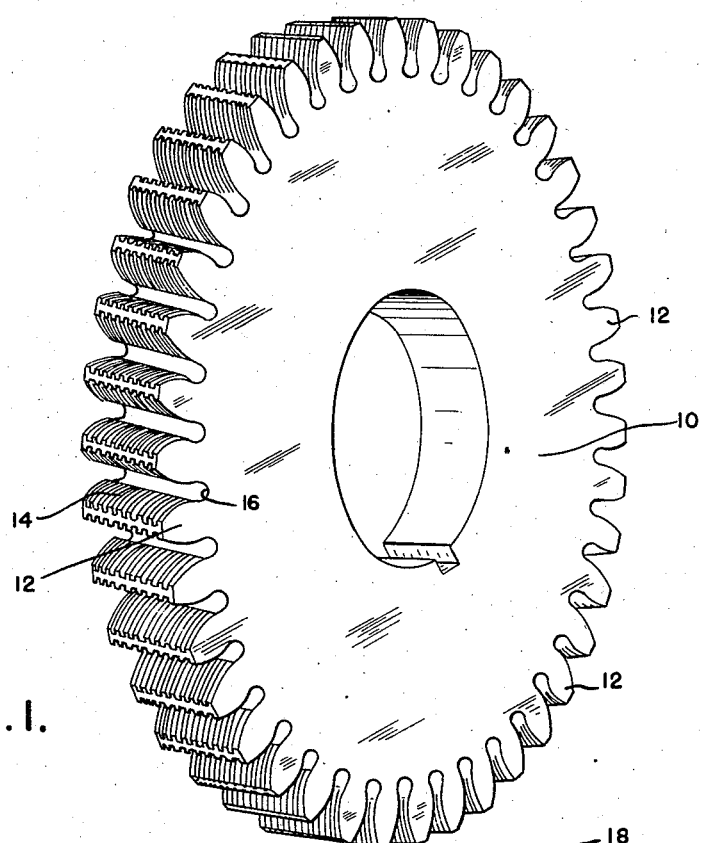
FIG. I.
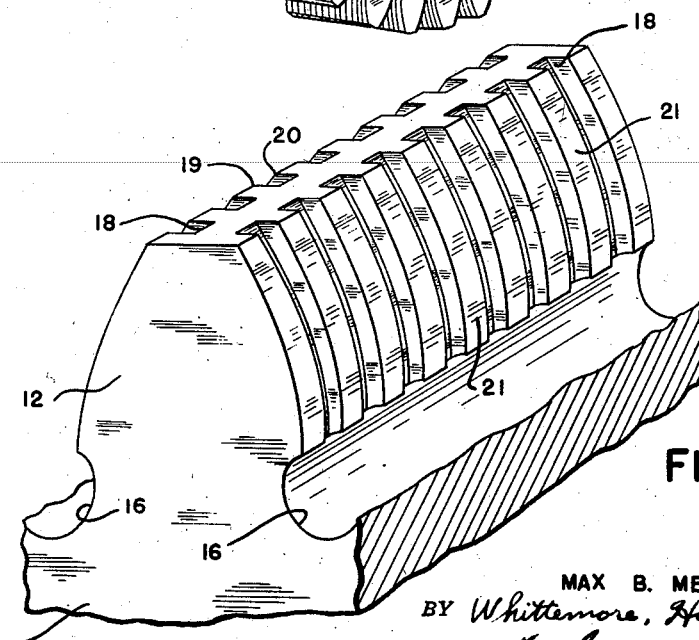
FIG. 2.
INVENTOR.
MAX B. MENTLEY
BY Whittemore, Hulbert
& Belknap ATTORNEYS Patented Feb. 24, 1942

2,274,491

UNITED STATES PATENT OFFICE 2,274,491

GEAR FINISHING TOOL

Max B. Mentley, Detroit, Mich., assignor to National Broach and Machine Company, Detroit, Mich., a corporation of Michigan Application April 8, 1940, Serial No. 328,566

5 Claims. (Cl. 29—103)

The present invention relates to a gear finishing tool and more particularly to the finishing tool in the form of a gear conjugate to the work gear being finished.

It has already been proposed to finish gear teeth by running them in mesh at crossed axes with a gear-like finishing tool conjugate to the gear being finished. The finishing tool employed in the past has been provided with serrations extending up and down the faces of the teeth so as to provide cutting corners thereon. Due to the crossed axes relationship referred to, a relative sliding between the teeth of the tool and the teeth of the gear in a direction lengthwise or from end to end thereof is introduced. This lengthwise sliding is a function of the crossed axes setting and is constant for any crossed axes setting at all points from the top to the bottom of the teeth. As is well-known, gear teeth when operating in mesh also have a relative sliding motion extending up and down the teeth, but this motion varies in amount from a maximum to a zero amount at the pitch line. By providing the serrations or cutting corners generally up and down the teeth, the shaving of a gear by a tool of this type is effected primarily by the relative lengthwise or end to end slippage between the teeth. The gear teeth are therefore finished uniformly and in accurate involute profile and the teeth of the cutter reproduce a similar involute profile on the teeth of the gear.

In the manufacture of these cutters or tools in the past it has been the practice as a final operation to grind the faces of the cutter teeth. This grinding operaton provides a very accurately controlled tooth profile and at the same time provides a very smooth surface to the lands intermediate the grooves provided in the teeth.

It was originally thought that the surfaces of these lands should be as smooth as possible, and experiments were carried out with a view to making these surfaces both as smooth and as hard as possible. I have discovered, however, that it is not desirable that these surfaces of the lands should be entirely smooth. Experiments have shown that where the surface of the land is finished so as to have substantially a polished surface, the results obtained are not satisfactory. As a matter of fact I have found that in some cases where the surfaces of the lands are finished so as to have substantially a polished surface, the cutter completely refuses to cut, and when operated in the conventional manner it accomplishes only a burnishing operation.

It may be pointed out at this time that gear finishing tools of the type referred to herein are adapted to be employed in gear finishing operations as disclosed in Patent 2,126,178, entitled "Rotary gear cutting tool," granted April 9, 1938, to Robert S. Drummond. In this operation the gear to be finished and the gear-like cutting tool are placed in mesh with their axes crossed at a limited angle, preferably between 3° and 30°. The parts are then rotated in mesh by rotating either the gear or the cutter directly, the other part being rotated solely through the intermeshing engagement of the parts. During the rotation as aforesaid, the relative translation between the parts is introduced in a plane parallel to the axes of both the gear and cutter and in a direction transverse to the axis of the cutter. This distributes the finishing action from end to end of the gear teeth.

According to the present invention, after grinding the teeth of the cutter to the desired contour these cutter teeth are further treated so as to roughen the surface of the lands. This operation may be effected by shot blasting or by rubbing the surface of the lands with an abrasive element, preferably in a direction up and down the cutter teeth, that is, generally radially of the cutter.

It is accordingly an object of the present invention to provide a gear-like cutting tool of the type described characterized by the provision of roughened bearing surfaces between the cutter and work.

It is a further object of the present invention to provide a gear-like cutting tool of the type described characterized by the provision of roughened lands adjacent the cutting corners.

It is a further object of the present invention to provide a gear cutting tool of the type described characterized by the provision of lands having marks of a depth of between .0002 and .003 inch.

It is a further object of the present invention to provide roughened lands on a gear finishing tool of the type described by engaging the surfaces of the lands with a stationary grinding element in an involute grinding machine.

Other objects of the invention will be apparent as the description proceeds, and when taken in conjunction with the accompanying drawing wherein:

Figure 1 is a perspective view of a cutter made according to the present invention; and Figure 2 is an enlarged perspective of a tooth of the cutter shown in Figure 1.

I have illustrated the present invention as applied to cutters of the type adapted to operate on spur or helical gears, although it will be evident that the invention is capable of broader application, as for example to cutters adapted to finish bevel gears, hypoid gearing and the like.

Referring now to the drawing, I have illustrated the cutter 10, which is in the form of a cylindrical blank having teeth 12 formed peripherally thereon. The limiting surfaces 14 of the teeth 12 are conjugate to the teeth of the gear to be finished, and where the teeth of the gear to be finished are involute the teeth of the cutter will also be involute. Intermediate adjacent teeth as indicated at 16 is provided oil clearance slots which extend into the teeth adjacent the roots thereof. These slots 16 provide for the discharge of oil and chips.

As best seen in Figure 2, teeth 12 are provided with a plurality of grooves 18 which extend from the oil clearance slot 16 to the tops of the teeth. The grooves 18 are preferably straight-sided and provide cutting corners 19 and 20 for engagement with the teeth of the gear to be finished.

Cutters of this general type are covered in the prior Patent 2,126,178, referred to above, and I make no claim to any of the features thus far described, except as modified, as will hereafter be pointed out.

In the manufacture of cutters of the type described a blank of high-speed steel is hobbed to approximate form. The teeth formed by the hobbing operation are then provided with the grooves 18. These grooves may be formed in any desired manner, one method of forming them being illustrated in Patent 2,169,632, granted August 15, 1939 to Robert S. Drummond. After the grooves 18 are formed in the teeth, the blank is heat treated, after which the surface of the teeth 12 are accurately ground in a suitable involute grinder. Grinders of this form are well-known and essentially comprise a rotating plane surfaced grinding disc. The gear blank is supported and is moved relative to the grinding disc with a rolling generating action so that involute contours are formed on the teeth of the cutter. Suitable modifications and departures from a true involute may of course be provided as desired.

During this operation the grinder is preferably rotated at high speed, with the result that an extremely smooth polished surface is provided on the faces 21 of the lands.

Gear finishing tools of this type are adapted to machine the surfaces of the gear teeth with a very high degree of accuracy, and it is accordingly essential that the surfaces 21 which together determine the effective contour of the cutter teeth 12 shall be machined with a corresponding high degree of accuracy. In the past this operation has resulted in a two-fold effect; not only have the surfaces 21 been finished to the requisite degree of accuracy but they have also been machined such that their surfaces are extremely smooth, being in effect equivalent to polished surfaces.

I have found that where the top surfaces of the lands 21 are extremely smooth, the effectiveness of the cutter as a shaving cutter is substantially reduced. This has been definitely established by making a cutter according to the foregoing method and finishing the surfaces 21 as smoothly as possible. Where this has been done, the cutter has completely refused to cut, and instead has performed only a burnishing operation when run in mesh with the gear. I have found that where the surfaces 21 and tops of the lands are roughened so as to provide definite marks and/or scratches thereon, the effectiveness of the tool is materially increased. This roughening may be accomplished in several manners. For example I have found that if the surfaces are lightly shot blasted after they have been ground to the desired contour within the requisite limitation of error, satisfactory results are obtained. Another manner of providing the marks or scratches which roughen the surfaces is to place the cutter in a conventional involute grinder of the type previously referred to. Rotation of the grinding wheel is stopped and the cutter blank is moved with a rolling, generating motion against the stationary grinding wheel. This relative motion is the same as employed in finish grinding the teeth 12 of the cutter with the exception that the grinding disc is not rotated. This results in providing minute marks or scratches extending generally up and down the surfaces 21.

The roughening of the surfaces 21 is not of course carried on to a degree where accuracy of the finished product is adversely effected. I have found that if the roughening marks are provided having a depth of between .0002 and .003 inch, satisfactory results are obtained. At the same time the provision of this roughened surface does not apparently effect the accuracy of the shaved or finished gears. This result is expected of course since before the roughening operation the surfaces 21 are accurately ground to the desired profile within narrow limits of accuracy. The roughening operation is carried out uniformly over the surfaces 21 so that the enveloping surface defined by the various surfaces 21 still reproduce a conjugate tooth formed on the surfaces of the teeth of the gear machined thereby.

This definite provision of roughness improves the action of the tool for the following reasons. The pocks or marks or scratches thus provided carry oil across the surface of the tooth being shaved and prevents seizing. The land surfaces 21 are not relieved and serve as guiding surfaces. The operation is carried on in a stream of cutting oil, and this oil is picked up by the depressions in the land surfaces. It was formerly found that cutters made by prior practices had a tendency to seize, picking up metal on the land surfaces. Thus, on cast iron gears, a cutter after some usage, glazed and became practically inoperative.

The roughening operation further reduces the total contact between the surfaces of gear and tool, thus facilitating the cutting operation, and reducing operating pressures. Furthermore, the roughening operation will roughen the cutting edges 19 and 20 which is desirable by reason of the particular cutting action.

While I have disclosed a specific tool and have described two specific methods of making the tool, this disclosure is made solely for the purpose of enabling those skilled in the art to practice the invention the scope of which is indicated by the appended claims.

What I claim as my invention is:

1. A gear cutter in the form of a gear conjugate at crossed axes to a gear to be finished, said cutter having grooves extending generally up and down the faces of its teeth, and lands intermediate said grooves, said lands having cutting corners, the surfaces intermediate said corners being slightly pitted as by shot blasting.

2. A gear cutter in the form of a gear conjugate at crossed axes to a gear to be finished, said cutter having grooves extending generally up and down the faces of its teeth, and lands intermediate said grooves, said lands having cutting corners, the surfaces intermediate said corners being provided with roughening marks in the form of long scratches extending generally parallel to said lands and grooves.

3. A gear cutter in the form of a gear conjugate at crossed axes to a gear to be finished, said cutter having grooves extending generally up and down the faces of its teeth, and lands intermediate said grooves, said lands having cutting corners, the surfaces intermediate said corners being slightly but uniformly roughened, the amount of roughening being between .0002 and .003 inch.

4. A gear cutter in the form of a gear conjugate at crossed axes to a gear to be finished, said cutter having grooves extending generally up and down the faces of its teeth, and lands intermediate said grooves, said lands having cutting corners, the surfaces intermediate said corners being slightly pitted as by shot blasting, the depth of pits being between .0002 and .003 inch.

5. A gear cutter in the form of a gear conjugate at crossed axes to a gear to be finished, said cutter having grooves extending generally up and down the faces of its teeth, and lands intermediate said grooves, said lands having cutting corners, the surfaces intermediate said corners being provided with roughening marks in the form of long scratches extending generally parallel to said lands and grooves, the depth of said scratches being between .0002 and .003 inch.

MAX B. MENTLEY.